US012580118B2

(12) United States Patent
Oide et al.

(10) Patent No.: US 12,580,118 B2
(45) Date of Patent: Mar. 17, 2026

(54) MULTI-LAYER INDUCTOR

(71) Applicant: TDK CORPORATION, Tokyo (JP)

(72) Inventors: Akihiko Oide, Tokyo (JP); Makoto Yoshino, Tokyo (JP); Tomoki Okada, Yurihonjo-city (JP); Masashi Shimoyasu, Tokyo (JP); Daiki Kato, Tokyo (JP); Hideki Saitou, Yurihonjo-city (JP); Seiji Osada, Yurihonjo-city (JP); Kazuhiro Ebina, Tokyo (JP)

(73) Assignee: TDK CORPORATION, Tokyo (JP)

( * ) Notice: Subject to any disclaimer, the term of this patent is extended or adjusted under 35 U.S.C. 154(b) by 994 days.

(21) Appl. No.: 17/693,810

(22) Filed: Mar. 14, 2022

(65) Prior Publication Data

US 2022/0301761 A1 Sep. 22, 2022

(30) Foreign Application Priority Data

Mar. 17, 2021 (JP) ................................ 2021-043556

(51) Int. Cl.

*H01F 27/28* (2006.01)
*H01F 17/00* (2006.01)
*H01F 27/29* (2006.01)
*H01F 41/04* (2006.01)

(52) U.S. Cl.

CPC ..... *H01F 27/2847* (2013.01); *H01F 17/0006* (2013.01); *H01F 27/292* (2013.01); *H01F 41/04* (2013.01); *H01F 2017/0073* (2013.01)

(58) Field of Classification Search

CPC ............. H01F 27/2847; H01F 17/0006; H01F 27/292; H01F 41/04; H01F 2017/0073; H01F 17/0013; H01F 17/04; H01F 41/043; H01F 41/046; H01F 27/2804; H01F 2027/2809

USPC ................................ 336/199, 200, 232, 192

See application file for complete search history.

(56) References Cited

U.S. PATENT DOCUMENTS

2013/0257576 A1* 10/2013 Arata .................. H01F 17/0013 336/200
2018/0122555 A1* 5/2018 Kim ...................... H01F 27/292
2019/0355508 A1* 11/2019 Lim ..................... H01F 17/0013
2020/0176170 A1* 6/2020 Terauchi ............. H01F 27/2804

FOREIGN PATENT DOCUMENTS

CN 101572161 A 11/2009
JP H8-306586 A 11/1996
JP H9-205018 A 8/1997
JP 2002170713 A * 6/2002
JP 2020-088289 A 6/2020

* cited by examiner

*Primary Examiner* — Shawki S Ismail
*Assistant Examiner* — Kazi S Hossain
(74) *Attorney, Agent, or Firm* — Oliff PLC

(57) ABSTRACT

In the multi-layer inductor, a through conductor provided in a sintered element body includes a pair of extracting conductors and a pair of internal conductors, and an end portion of the extracting conductor and an end portion of the internal conductor overlap each other in a stacking direction of the element body. Thus, the amount of shrinkage of each conductor during sintering of the element body is reduced, and internal stress generated in the element body after sintering is prevented.

5 Claims, 6 Drawing Sheets

MULTI-LAYER INDUCTOR

CROSS-REFERENCE TO RELATED APPLICATIONS

This application is based upon and claims the benefit of priority from Japanese Patent Application No. 2021-43556, filed on 17 Mar. 2021, the entire contents of which are incorporated herein by reference.

TECHNICAL FIELD

The present disclosure relates to a multi-layer inductor.

BACKGROUND

Known in the art is an inductor including a through conductor linearly extending in an element body has been known. Japanese Patent Application Laid-Open No. 2020-88289 discloses an inductor including an element body having a pair of end surfaces facing each other, a through conductor extending flatly between the end surfaces, and a pair of external electrodes provided on both the end surfaces of the element body and connected to the through conductor.

SUMMARY

The above-described element body of the inductor according to the conventional art is a sintered body (sintered element body) obtained by sintering a plurality of magnetic material layers stacked. The through conductor is obtained by sintering the conductive paste applied on the magnetic material layer together with the magnetic material layer. In general, the shrinkage rate of the magnetic material layer and the shrinkage rate of the conductive paste at the time of sintering are different. Therefore, an internal stress due to a difference in shrinkage rate is generated in the element body after sintering, and cracks caused by the internal stress may be generated in the element body. As a result of intensive studies, the present inventors have newly found a technique capable of preventing cracks caused by internal stress.

According to an aspect of the present disclosure, a multi-layer inductor in which cracks are prevented is provided.

A multi-layer inductor includes, a sintered element body including a plurality of layers stacked and having a pair of end surfaces facing each other in a first direction orthogonal to a stacking direction of the plurality of layers, a through conductor provided in the sintered element body and extending between the pair of end surfaces, both end portions of the through conductor are exposed at the end surfaces, and a pair of external electrodes provided on the end surfaces of the sintered element body and covering both the end portions of the through conductor exposed to the end surfaces, respectively, wherein the through conductor includes, a pair of extracting conductors respectively constituting both the end portions of the through conductor and each having a first end portion exposed from the end surface of the element body and a second end portion located inside the element body, and an inner conductor connecting the pair of extracting conductors to each other and having ends overlapping the second end portions of the extracting conductors in the stacking direction of the plurality of layers.

In the above multi-layer inductor, the through conductor includes the extracting conductor and the internal conductor, and the second end portion of the extracting conductor and the end portion of the internal conductor overlap each other in the stacking direction of the element body. The amount of shrinkage of each of the extracting conductor and the internal conductor during sintering is small, and internal stress generated in the element body after sintering can be prevented. Therefore, in the above multi-layer inductor, cracks caused by internal stress can be prevented.

In the multi-layer inductor according to another aspect, the extracting conductor is shorter in the first direction than the inner conductor in the first direction.

The multi-layer inductor according to another aspect further includes a step portion formed by the second end portion of the extracting conductor and the end portion of the inner conductor overlapping the second end portion.

In the multi-layer inductor according to another aspect, the through conductor comprises a plurality of the inner conductors, each of the inner conductors extends parallel to the first direction, and the ends of the internal conductors adjacent to each other in the first direction overlap each other in the stacking direction of the plurality of layers.

DETAILED DESCRIPTION

Figure 1:
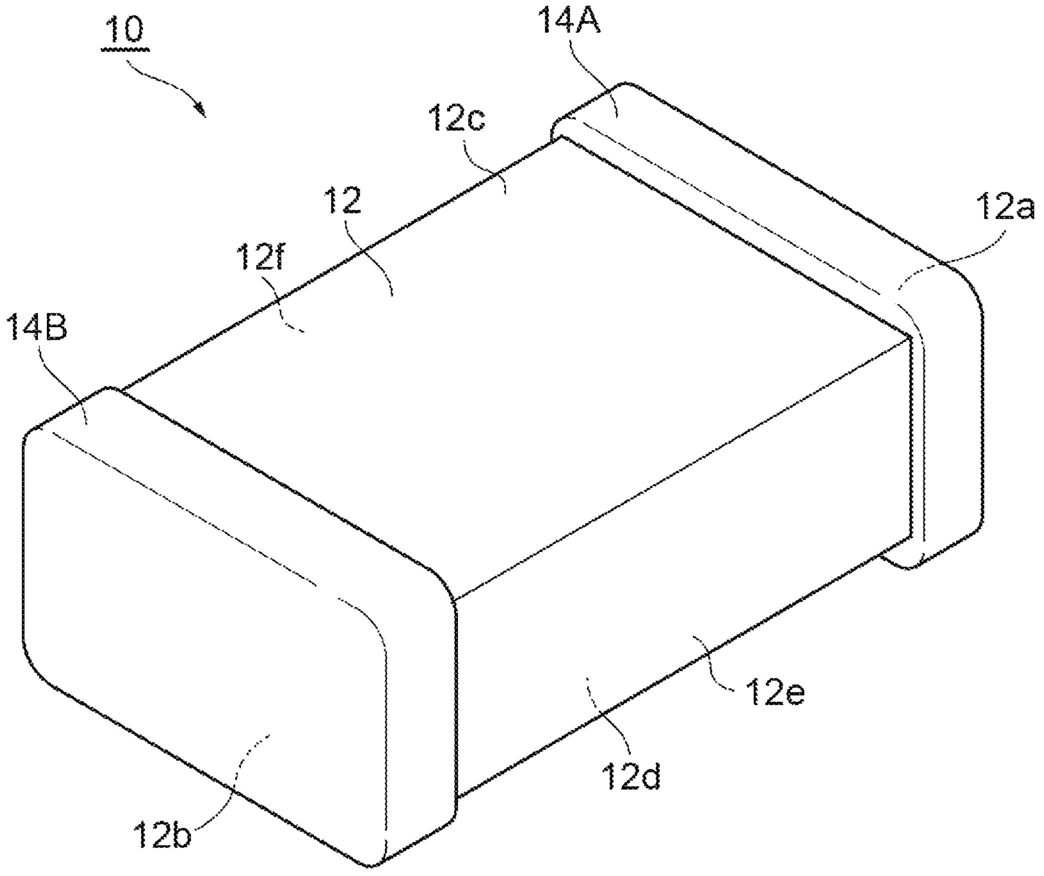
FIG. 1 is a perspective view showing a multi-layer inductor according to an embodiment.

Hereinafter, embodiments for carrying out the present disclosure will be described with reference to the accompanying drawings. In the description of the drawings, the same or equivalent elements are denoted by the same reference numerals, and redundant description will be omitted.

The configuration of a multi-layer inductor according to an embodiment will be described with reference to FIGS. 1 to 3. As shown in FIG. 1, the multi-layer inductor 10 according to the embodiment includes an element body 12 and a pair of external electrodes 14A and 14B.

The element body 12 has a substantially rectangular parallelepiped outer shape and includes a pair of end surfaces 12*a* and 12*b* facing each other in the extending direction of the element body 12. The element body 12 further includes four side surfaces 12*c* to 12*f* extending in the facing direction of the end surface 12*a* and 12*b* to connect the end surfaces 12*a* and 12*b* to each other. The side surface 12*d* is a mounting surface facing the mounting substrate when the multi-layer inductor 10 is mounted, and the side surface 12*c* facing the side surface 12*d* is a top surface when the multi-layer inductor 10 is mounted. The dimensions of the element body 12 are, for example, 2.5 mm length×2 mm width×0.9 mm thickness, where a dimension in the facing direction of the end faces 12*a* and 12*b* is a length, a dimension in the facing direction of the side faces 12*e* and 12*f* is a width, and a dimension in the facing direction of the side faces 12*c* and 12*d* is a thickness.

The element body 12 has a configuration in which a through conductor 20 is provided inside a magnetic body 18. As shown in FIG. 3, the element body 12 has a stacking structure in which a plurality of magnetic material layers 19 constituting the magnetic material 18 are stacked in the facing direction of the side surfaces 12*c* and 12*d*. In the following description, the facing direction of the side surfaces 12*c* and 12*d* is also referred to as a stacking direction of the element body 12, and the facing direction of the end surfaces 12*a* and 12*b* orthogonal to the stacking direction of the element body 12 is also referred to as a first direction.

The magnetic body 18 is made of a magnetic material such as ferrite. The magnetic body 18 is obtained by stacking a plurality of unsintered magnetic bodies (green sheets or green paste layers) to be the magnetic material layer 19 and sintering. The number of magnetic material layers 19 constituting the element body 12 is, for example, 150. In the actual element body 12, the plurality of magnetic material layers 19 are integrated to such an extent that the boundaries between the layers cannot be visually recognized.

Figure 2:
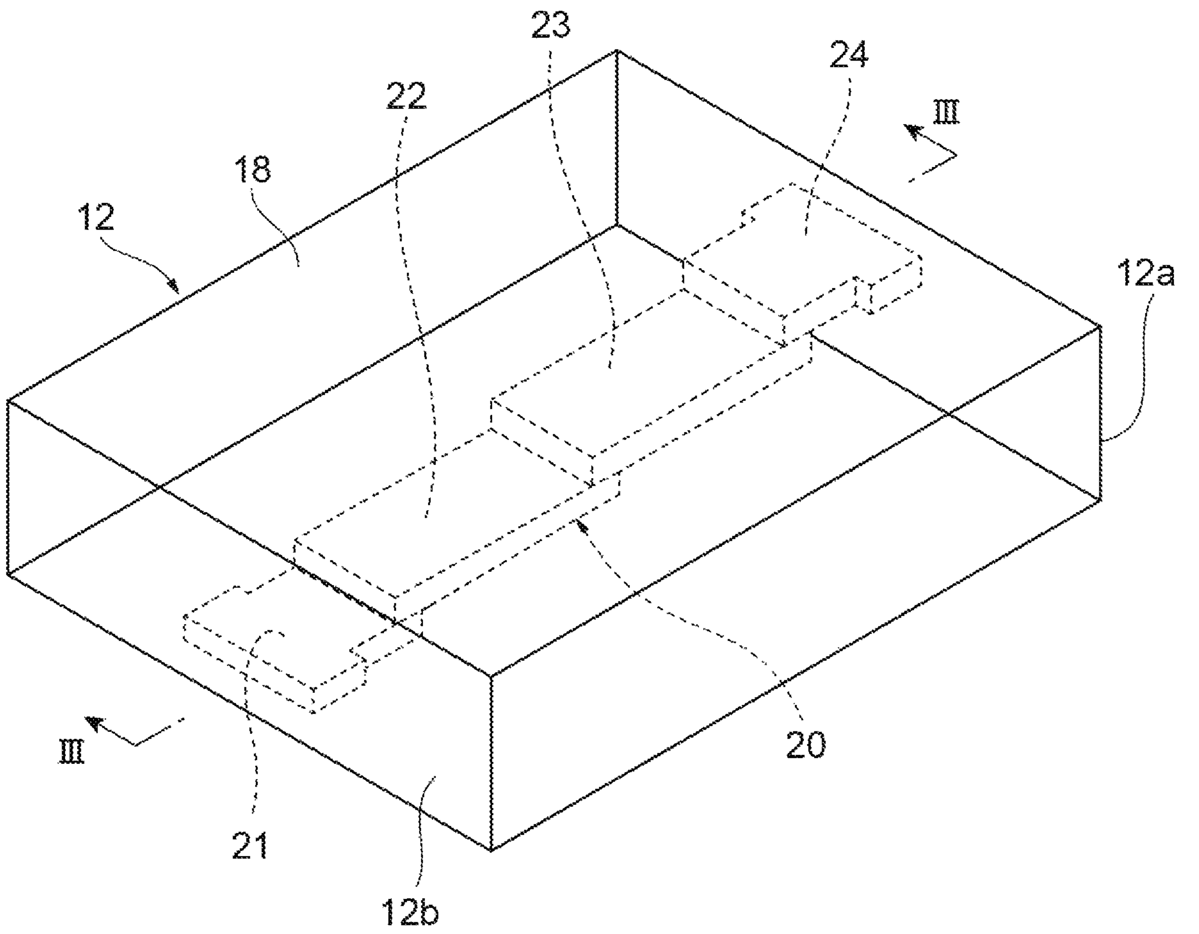
FIG. 2 is a perspective view showing the through conductor of the element body shown in FIG. 1.
Figure 3:
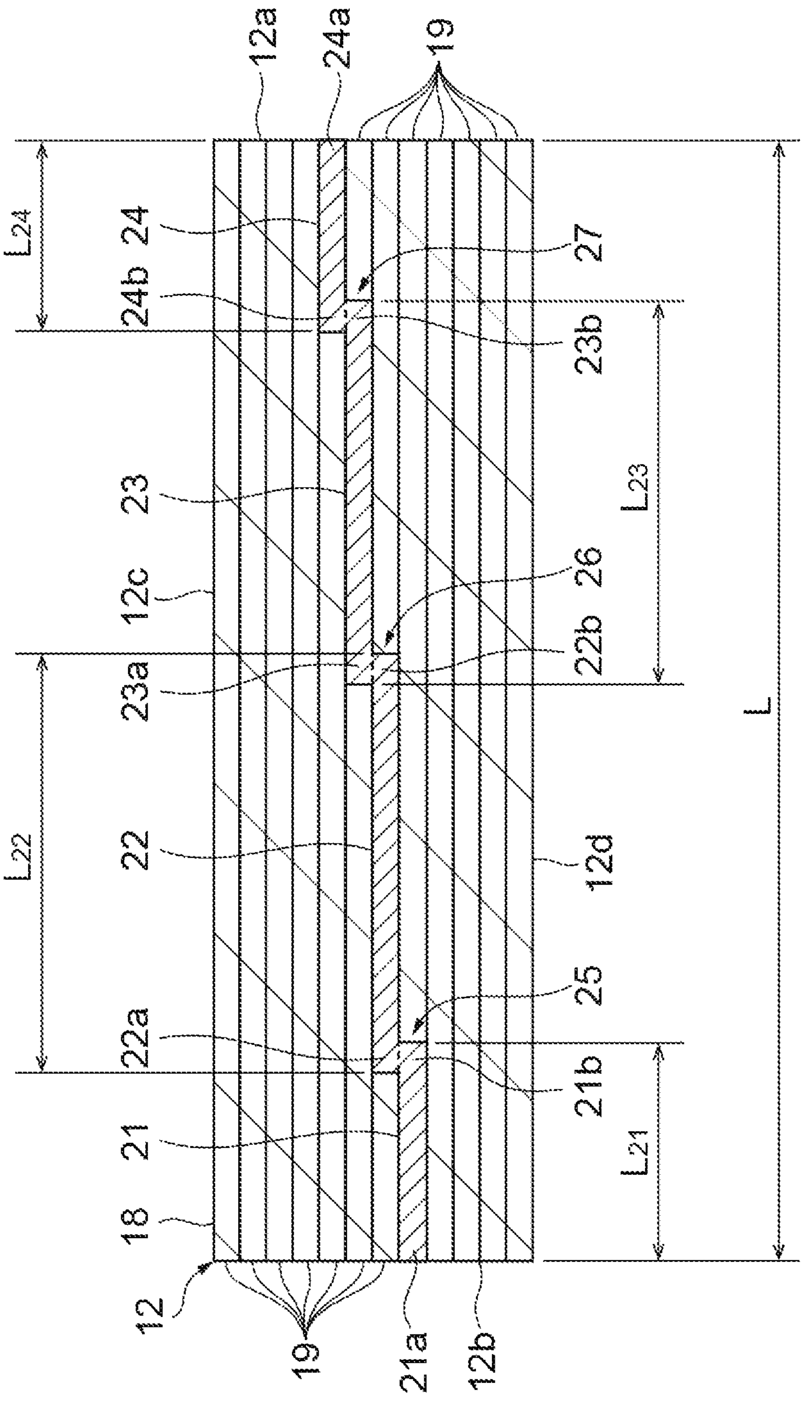
FIG. 3 is a cross-sectional view taken along line III-III of the element body shown in FIG. 2.

As shown in FIGS. 2 and 3, the through conductor 20 extends between the pair of end surfaces 12*a* and 12*b*. The through conductor 20 includes a plurality of conductors, and formed of a pair of extracting conductors 21 and 24 and a pair of internal conductors 22 and 23 in the present embodiment. The through conductor 20 is made of a metal material. In the present embodiment, the through conductor 20 is made of Ag.

The pair of extracting conductors 21 and 24 constitute both ends of the through conductor 20, respectively. More specifically, the extracting conductor 21 constitutes an end portion of the through conductor 20 located on the end surface 12*b* side, and the extracting conductor 24 constitutes an end portion of the through conductor 20 located on the end surface 12*a* side. Each of the pair of extracting conductors 21 and 24 has a substantially rectangular flat plate shape and extends parallel to the side surface 12*d*. As shown in FIG. 3, the pair of extracting conductors 21 and 24 are located between different layers of the plurality of magnetic material layers 19. More specifically, the extracting conductor 24 is located farther away from the side surface 12*d* than the extracting conductor 21.

The extracting conductor 21 has a first end portion 21*a* and a second end portion 21*b* as end portions in the facing direction (first direction) of the end surfaces 12*a* and 12*b*. The first end portion 21*a* is exposed from the end surface 12*b*. The second end portion 21*b* is located inside the element body 12. The extracting conductor 21 has a slip shape extending along the first direction, and the first end portion 21*a* is relatively wide. The extracting conductor 24 has a first end portion 24*a* and a second end portion 24*b* as end portions in the first direction. The first end portion 24*a* is exposed from the end surface 12*a*. The second end portion 24*b* is located inside the element body 12. The extracting conductor 24 has a slip shape extending along the first direction, and the first end portion 24*a* is relatively wide.

The pair of extracting conductors 21 and 24 have lengths $L_{21}$ and $L_{24}$ in the first direction, respectively. The lengths $L_{21}$ and $L_{24}$ are both shorter than the length L of the element body 12 in the first direction. The length $L_{21}$ of the extracting conductors 21 and the length $L_{24}$ of the extracting conductors 24 may be equal to or different from each other.

The pair of internal conductors 22 and 23 cooperate to connect the pair of extracting conductors 21 and 24. More specifically, the pair of internal conductors 22 and 23 are arranged in the order of the internal conductor 22 and the internal conductor 23 from the extracting conductor 21 toward the extracting conductor 24. Each of the pair of internal conductors 22 and 23 has a rectangular flat plate shape and extends in parallel to the side surface 12*d*. As shown in FIG. 3, the pair of internal conductors 22 and 23 are located between different layers of the plurality of magnetic material layers 19. More specifically, the inner conductor 23 is located farther from the side surface 12*d* than the inner conductor 22.

The internal conductor 22 has a first end portion 22*a* at the end surface 12*b* side and a second end portion 22*b* at the end surface 21*a* side as end portions in the first direction. Similarly, the internal conductor 23 has a first end portion 23*a* at the end surface 12*b* side and a second end portion 23*b* at the end surface 21*a* side as end portions in the first direction.

The pair of internal conductors 22 and 23 have lengths $L_{22}$ and $L_{23}$ in the first direction, respectively. The lengths $L_{22}$ and $L_{23}$ are both shorter than the length L of the element body 12 in the first direction. The length $L_{22}$ of the inner conductors 22 and the length $L_{23}$ of the inner conductors 23 may be equal to or different from each other. The lengths $L_{22}$ and $L_{23}$ of the inner conductors 22 and 23 may be designed to be longer than the lengths $L_{21}$ and $L_{24}$ of the extracting conductors 21 and 24.

As shown in FIG. 3, the first end portion 22*a* of the internal conductor 22 and the second end portion 21*b* of the extracting conductor 21 overlap each other in the stacking direction of the element body 12. More specifically, the first end portion 22*a* of the inner conductor 22 overlaps the end portion 21*b* of the extracting conductor 21 from the upper side (that is, the side surface 12*c* side). As a result, the extracting conductor 21 and the internal conductor 22 are joined and electrically connected to each other. Further, a step portion 25 is formed at a joint portion between the first end portion 22*a* of the inner conductor 22 and the second end portion 21*b* of the extracting conductor 21.

The second end portion 23*b* of the inner conductor 23 and the second end portion 24*b* of the extracting conductor 24 overlap each other in the stacking direction of the element body 12. More specifically, the second end portion 23*b* of the internal conductor 23 overlaps the end portion 24*b* of the extracting conductor 24 from the lower side (that is, the side surface 12*d* side). As a result, the extracting conductor 24 and the internal conductor 23 are joined and electrically connected to each other. Further, a step portion 27 is formed at a joint portion between the second end portion 23*b* of the inner conductor 23 and the second end portion 24*b* of the extracting conductor 24.

Further, the second end portion 22*b* of the internal conductor 22 and the first end portion 23*a* of the internal conductor 23 overlap each other in the stacking direction of the element body 12. More specifically, the second end 22*b* of the internal conductor 22 overlaps the end 23*a* of the internal conductor 23 from the lower side (that is, the side surface 12*d* side). As a result, the pair of internal conductors 22 and 23 are joined and electrically connected to each other. A step portion 26 is formed at a joint between the second end portion 22*b* of the inner conductor 22 and the first end portion 23*a* of the inner conductor 23.

In this manner, the through conductor 20 has three step portions 25 to 27, and the four conductors 21 to 24 constituting the through conductor 20 are disposed in a step manner. The four conductors 21 to 24 are gradually apart from the side surface 12*d* from the extracting conductor 21 toward the extracting conductor 24.

The pair of external electrodes 14A and 14B are provided on the end surfaces 12*a* and 12*b* of the element body 12, respectively. The external electrode 14A covers the entire region of the end surface 12*a*, and is joined in direct contact with the end portion of the through conductor 20 exposed at the end surface 12*a*. Similarly, the external electrode 14B covers the entire region of the end surface 12*b* and is joined in direct contact with the end portion of the through conductor 20 exposed to the end surface 12*b*. In the present embodiment, as shown in FIG. 1, the external electrodes 14A and 14B integrally cover the end surfaces 12*a* and 12*b* and the side surfaces 12*c* to 12*f* of the region adjacent to the end surfaces 12*a* and 12*b*. Each of the external electrodes 14A and 14B is formed of one or more electrode layers. A metallic material such as Ag, for example, can be adopted as an electrode material constituting each of the external electrodes 14A and 14B.

Subsequently, a method for forming the element body 12 including the through conductor 20 described above will be described with reference to FIGS. 4A to 4C, 5A to 5C and 6A to 6C.

Figure 4A:
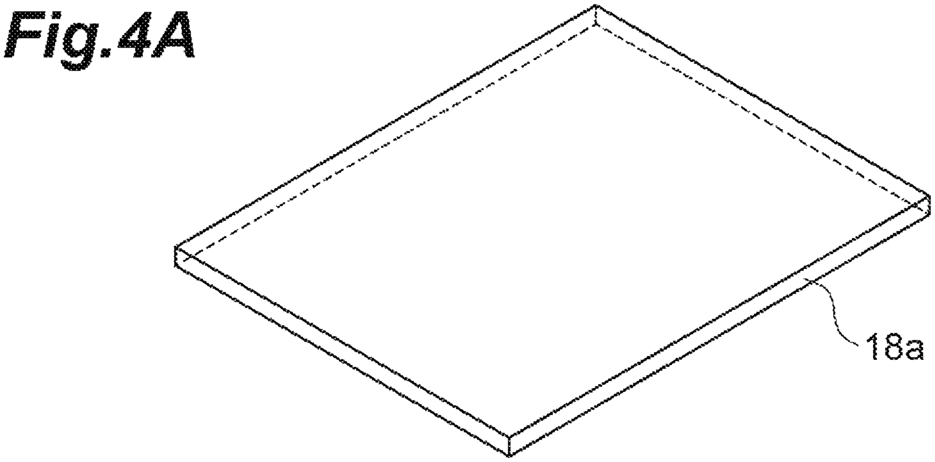
FIGS. 4A to 4C are views showing steps in manufacturing the element body.
Figure 4B:
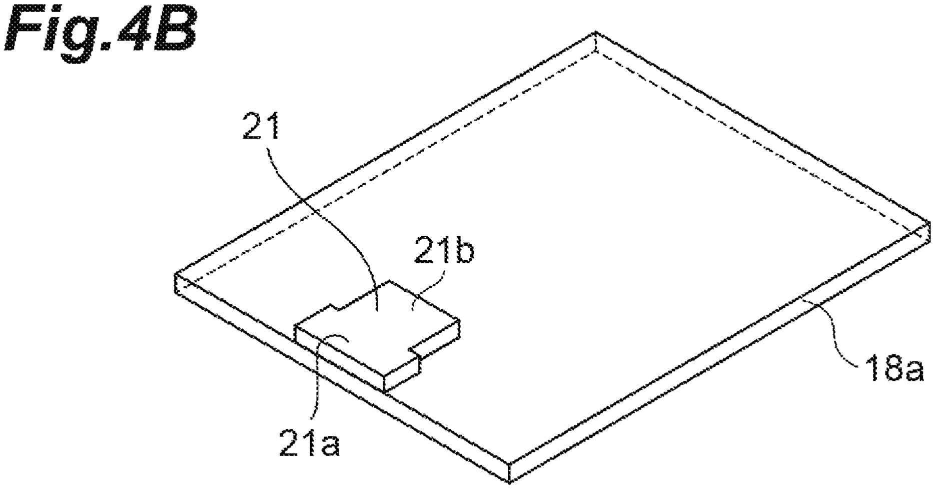
Figure 4C:
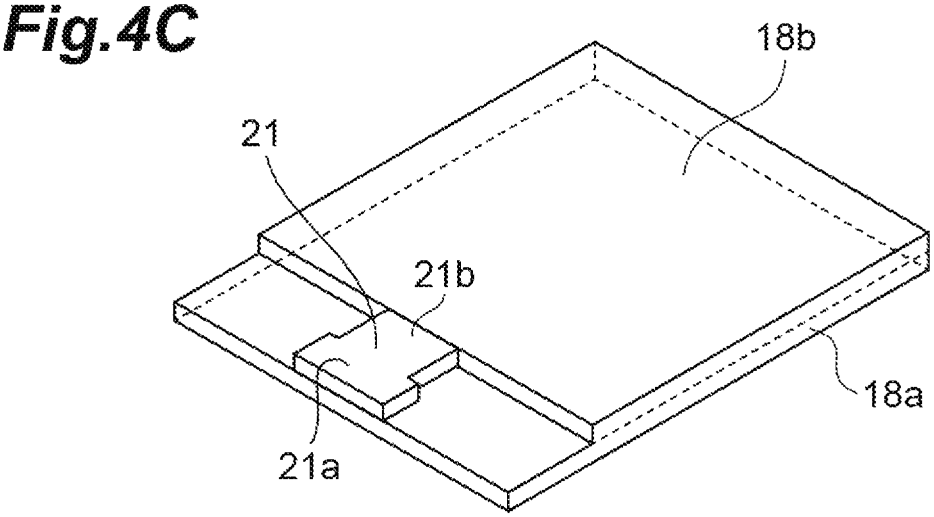

In forming the through conductor 20, firstly, a green sheet 18*a* to be a part of the element body 12 is prepared as shown in FIG. 4A. The green sheet 18*a* may be formed of a single layer or a plurality of layers. Then, as shown in FIG. 4B, the extracting conductor 21 is provided at the edge of the green sheet 18*a* serving as the end surface 12*b* of the element body 12. At this time, the extracting conductor 21 is in a conductive paste state and has not yet been sintered. The conductive paste is applied by, for example, screen printing. Next, as shown in FIG. 4C, a green paste layer 18*b* is applied and formed on the entire rectangular region from the extracting conductor 21 to the edge of the green sheet 18*a* serving as the end surface 12*a* of the element body 12 on the green sheet 18*a*.

Figure 5A:
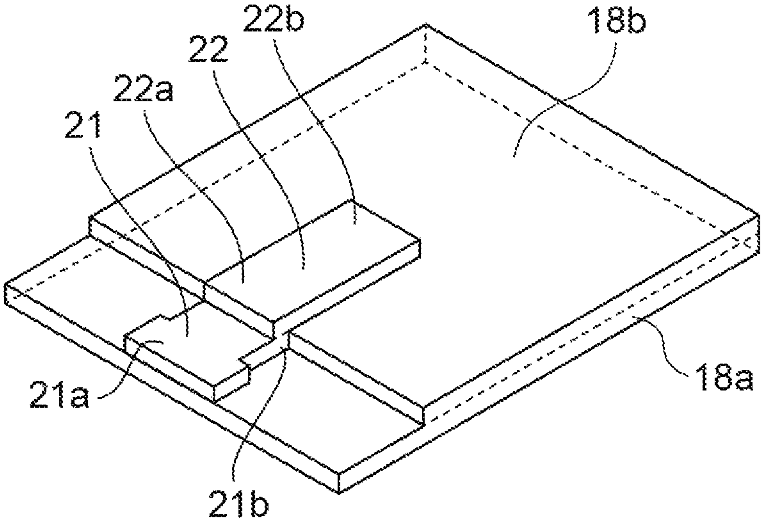
FIGS. 5A to 5C are views showing steps in manufacturing the element body.
Figure 5B:
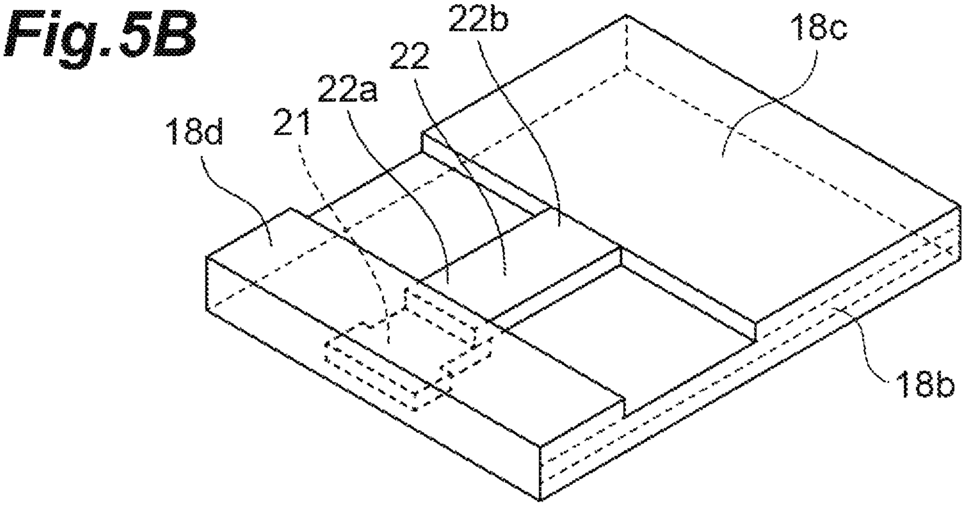
Figure 5C:
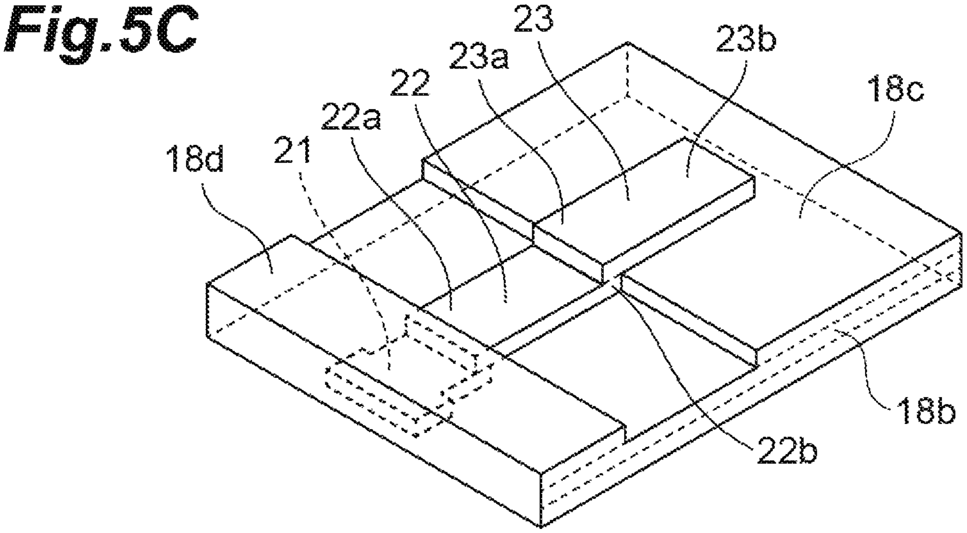

Subsequently, as shown in FIG. 5A, the internal conductor 22 in a conductive paste state is provided on the green paste layer 18*b* and the second end portion 21*b* of the extracting conductor 21. The inner conductor 22 is provided such that the first end portion 22*a* overlaps the second end portion 21*b* of the extracting conductor 21. Next, as shown in FIG. 5B, a green paste layer 18*c* is applied and formed on the green paste layer 18*b*. More specifically, the green paste layer 18*c* is provided entirely in a rectangular region from the internal conductor 22 to the edge of the green sheet 18*a* serving as the end surface 12*a* of the element body 12. Further, a green paste layer 18*d* covering the entire extracting conductor 21 is also applied and formed. Further, as shown in FIG. 5C, the internal conductor 23 in a conductive paste state is provided on the green paste layer 18*c* and the second end portion 22*b* of the internal conductor 22. The inner conductor 23 is provided so that the first end portion 23*a* overlaps the second end portion 22*b* of the inner conductor 22.

Figure 6A:
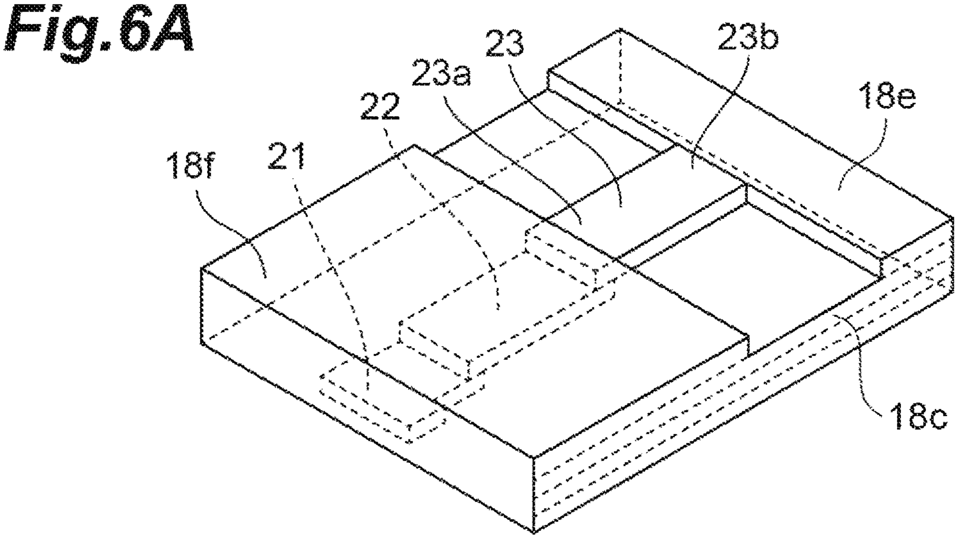
FIGS. 6A to 6C are views showing steps in manufacturing the element body.
Figure 6B:
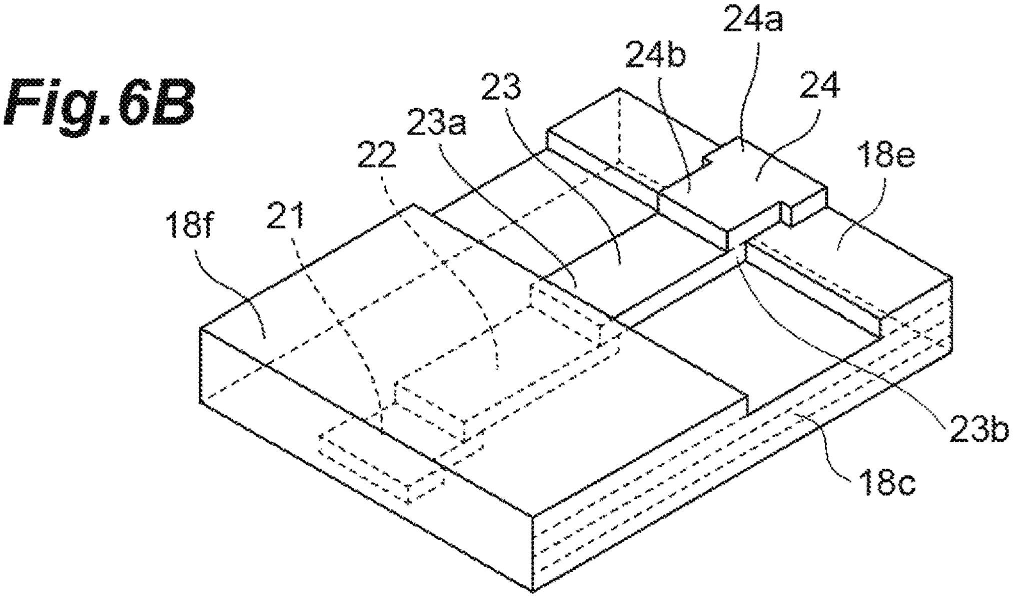
Figure 6C:
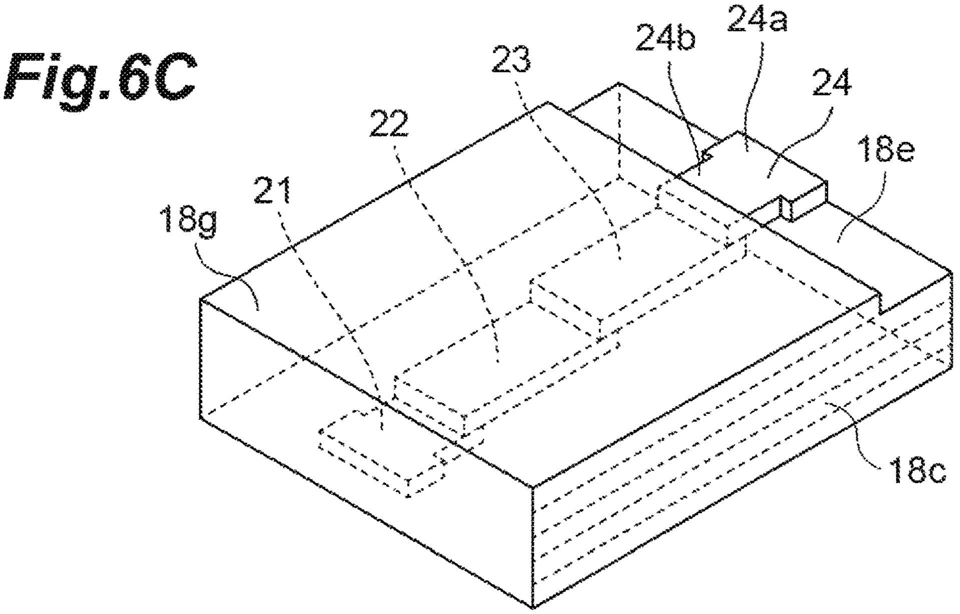

Subsequently, as shown in FIG. 6A, a green paste layer 18*e* is applied and formed on the green paste layer 18*c*. More specifically, the green paste layer 18*e* is entirely provided in a rectangular region from the internal conductor 23 to the edge of the green sheet 18*a* serving as the end surface 12*a* of the element body 12. A green paste layer 18*f* integrally covering the extracting conductor 21 and the internal conductor 22 is also applied and formed. Next, as shown in FIG. 6B, the extracting conductor 24 in a conductive paste state is provided on the green paste layer 18*e* and the second end portion 23*b* of the internal conductor 23. The extracting conductor 24 is provided so that the second end portion 24*b* overlaps the second end portion 23*b* of the internal conductor 23. Further, as shown in FIG. 6C, a green paste layer 18*g* integrally covering the extracting conductor 21 and the pair of internal conductors 22 and 23 is applied and formed. Then, a green paste layer (not shown) integrally covering the pair of extracting conductors 21 and 24 and the pair of internal conductors 22 and 23 is applied and formed to obtain an unsintered body 12.

Thereafter, the green body 12 is subjected to a sintering treatment to obtain the above-described element body 12. Finally, the external electrodes 14A and 14B are provided on the end surfaces 12*a* and 12*b* of the element body 12, respectively, to complete the multi-layer inductor 10 described above.

As described above, in the multi-layer inductor 10, the through conductor 20 provided in the sintered element body 12 includes the pair of extracting conductors 21 and 24 and the pair of internal conductors 22 and 23, and the second end portions 21*b* and 24*b* of the extracting conductors 21 and 24 and the end portions 22*a* and 23*b* of the internal conductors 22 and 23 overlap each other in the stacking direction of the element body 12.

The adjacent conductors 21 to 24 are electrically connected to each other at their ends, and function as the through conductor 20 as a whole. In addition, in the facing direction of the end surfaces 12*a* and 12*b*, the lengths $L_{21}$ to $L_{24}$ of the conductors 21 to 24 are shorter than the lengths L in a case where the through conductor is formed of one flat conductor. Thus, the amount of shrinkage of each of the conductors 21 to 24 during sintering of the element body 12 is reduced, and internal stress generated in the element body 12 after sintering is prevented. Therefore, in the multi-layer inductor 10, cracks caused by internal stress are prevented.

In the multi-layer inductor 10, the lengths $L_{21}$ and $L_{24}$ of the pair of extracting conductors 21 and 24 are designed to be shorter than the lengths $L_{22}$ and $L_{23}$ of the internal conductors 22 and 23. In this case, the amount of shrinkage of the extracting conductors 21 and 24 during sintering of the element body 12 is reduced. Therefore, for example, a situation in which the extracting conductors 21 and 24 enter the inside of the element body 12 from the end surfaces 12*a* and 12*b* is prevented, and a connection failure between the extracting conductors 21 and 24 and the external electrodes 14A and 14B is effectively prevented.

Although the embodiments of the present disclosure have been described above, the present disclosure is not necessarily limited to the above-described embodiments, and various modifications can be made without departing from the scope of the present disclosure. For example, the number of internal conductors of the through conductor is not limited to two, and may be one or three or more. The pair of extracting conductors may be located between the same layers of the plurality of layers.

What is claimed is:

1. A multi-layer inductor comprising:

a sintered element body including a plurality of layers stacked and having a pair of end surfaces facing each other in a first direction orthogonal to a stacking direction of the plurality of layers;

a through conductor provided in the sintered element body and extending between the pair of end surfaces, both end portions of the through conductor are exposed at the end surfaces; and a pair of external electrodes provided on the end surfaces of the sintered element body and covering both the end portions of the through conductor exposed to the end surfaces, respectively, wherein the through conductor includes:

a pair of extracting conductors respectively constituting both the end portions of the through conductor and each having a first end portion exposed from the end surface of the element body and a second end portion located inside the element body;

a plurality of inner conductors connecting the pair of extracting conductors to each other and having ends overlapping the second end portions of the extracting conductors in the stacking direction of the plurality of layers, the plurality of inner conductors being in direct contact with the extracting conductors;

wherein a longitudinal direction of each inner conductor of the plurality of inner conductors extends parallel to the first direction, and wherein ends of inner conductors of the plurality of inner conductors that are adjacent to each other are in direct contact and overlap each other in the stacking direction of the plurality of layers, wherein the plurality of inner conductors and the pair of extracting conductors are disposed in a step manner, and wherein positions of extracting conductors of the pair of extracting conductors are different with respect to the stacking direction of the plurality of layers.

2. The multi-layer inductor according to claim 1, wherein the pair of extracting conductors is shorter in the first direction than the plurality of inner conductors in the first direction.

3. The multi-layer inductor according to claim 1, further comprising a step portion formed by the second end portion of one extracting conductor of the pair of extracting conductors and the end portion of an inner conductor of the plurality of inner conductors overlapping the second end portion of the one extracting conductor.

4. The multi-layer inductor according to claim 1, wherein the plurality of inner conductors includes a first inner conductor and a second inner conductor each having a rectangular flat plate shape.

5. The multi-layer inductor according to claim 1, wherein:

wherein the plurality of inner conductors and the pair of extracting conductors are disposed in a continuous downward step manner from one extracting conductor to an other extracting conductor of the pair of extracting conductors.

* * * * *